US011668395B2

(12) United States Patent
Gross et al.

(10) Patent No.: US 11,668,395 B2
(45) Date of Patent: Jun. 6, 2023

(54) GASKET INCLUDING CHANNEL-RETENTION FEATURES

(71) Applicant: Federal-Mogul Motorparts LLC, Southfield, MI (US)

(72) Inventors: Jeffrey R. Gross, Chicago, IL (US); Brent J. Loomis, Chicago, IL (US); Wilford Dean Virgin, Spring Grove, IL (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 523 days.

(21) Appl. No.: 16/668,958

(22) Filed: Oct. 30, 2019

(65) Prior Publication Data

US 2021/0131559 A1 May 6, 2021

(51) Int. Cl.
*F16J 15/08* (2006.01)

(52) U.S. Cl.
CPC ...... *F16J 15/0818* (2013.01); *F16J 2015/085* (2013.01)

(58) Field of Classification Search
CPC ... F16J 15/0818; F16J 2015/085; F16J 15/021
See application file for complete search history.

(56) References Cited

U.S. PATENT DOCUMENTS

| | | |
|---|---|---|
| 3,655,210 A | 4/1972 | Farnam et al. |
| 4,535,996 A * | 8/1985 | Cardis ............... F16J 15/127 |
| | | 277/313 |
| 4,597,583 A | 7/1986 | Inciong et al. |
| 4,784,396 A * | 11/1988 | Scott ..................... F16B 41/002 |
| | | 277/598 |
| 5,551,705 A | 9/1996 | Chen et al. |
| 6,536,775 B1 | 3/2003 | Inciong |
| 6,685,197 B1 | 2/2004 | Rakauskas |
| 6,848,161 B1 | 2/2005 | Folino et al. |
| 7,832,736 B2 | 11/2010 | Takahashi et al. |

(Continued)

FOREIGN PATENT DOCUMENTS

| | | |
|---|---|---|
| JP | 2006090549 A | 4/2006 |
| JP | 2009125903 A | 6/2009 |

(Continued)

OTHER PUBLICATIONS

Photo of Navistar Part No. 1841016 Gasket FC Rear Half (Oil). Part in public use in 2004.

(Continued)

*Primary Examiner* — Eugene G Byrd
(74) *Attorney, Agent, or Firm* — Federal-Mogul Motorparts LLC

(57) ABSTRACT

A gasket includes an endless loop of sealing material. The endless loop includes a first segment, a second segment, and a sinuous segment extending from the first segment to the second segment. The gasket includes fastener sections defining fastener holes. The fastener holes extends through the fastener sections. The sinuous segment is between two of the fastener holes. A lip is in each fastener hole. The lip extends from the fastener section into the fastener hole and extends around the circumference of the fastener hole. The sinuous segment retains the gasket in a groove of a cover, and the lip retains a fastener in a fastener hole of the cover.

20 Claims, 4 Drawing Sheets

(56) References Cited

U.S. PATENT DOCUMENTS

| | | | |
|---|---|---|---|
| 8,162,326 | B2 | 4/2012 | Hohe et al. |
| 8,459,657 | B2 | 6/2013 | Ueta et al. |
| 8,833,771 | B2 | 9/2014 | Lesnau, IV et al. |
| 9,651,152 | B2 | 5/2017 | Lesnau, IV et al. |
| 2005/0046120 | A1 | 3/2005 | Novil et al. |
| 2005/0187331 | A1 | 8/2005 | Yuan et al. |

FOREIGN PATENT DOCUMENTS

| | | |
|---|---|---|
| JP | 2009216151 A | 9/2009 |
| JP | 2013242025 A | 12/2013 |
| NL | 6415320 A | 7/1966 |

OTHER PUBLICATIONS

Felpro Valve Cover Gasket Set [online]. Advance Auto Parts, 2019 [retrieved on Oct. 2, 2019]. Retrieved from Internet: <https://shop.advanceautoparts.com/p/felpro-valve-cover-gasket-set-vs-50531-r/20680273-p?c3ch=PLA&c3nid=20680273-P&adtype=pla&product_channel=local&gclid=CjwKCAjw-ITqBRB7EiwAZ1c5U31V0YgUY7irO3QtmEixaOPE10eOGbNG20vk1Ezco_FCjMuvV3mrlhoCk4cQAvD_BwE&gclsrc=aw.ds>.

Fel-Pro VS50750R1 Engine Valve Cover Gasket Set [online]. Car Parts Discount, 2019 [retrieved on Oct. 2, 2019]. Retrieved from Internet: <https://www.carpartsdiscount.com/valve-cover-seals-engine-gasket-set.html?3593=1483451>.

Valve Cover Gasket Set [online]. O'Reilly Auto Parts, 2019 [retrieved on Oct. 2, 2019], Retrieved from Internet: <https://www.oreillyauto.com/shop/b/gaskets-25077/engine-25078/valve-cover-25083/valve-cover-gasket-set-12130/f1a136b8458d>.

2009 Nissan Altima 2.5L Engine Valve Cover Gasket Set VC657G -3 [online]. Engine Parts Only, 2019 [retrieved on Oct. 2, 2019], Retrieved from Internet: <https://www.enginepartsonly.com/2009-nissan-altima-2-5l-engine-valve-cover-gasket-set-vc657g-3/>.

Photos of Navistar Part No. 1841016 Gasket FC Rear Half (Oil). Part in public use in 2004.

PCT Notification of Transmittal of the International Search Report and Written Opinion of the International Search Authority regarding International Application No. PCT/US2020/057689 dated Feb. 16, 2021 (79 pages).

\* cited by examiner

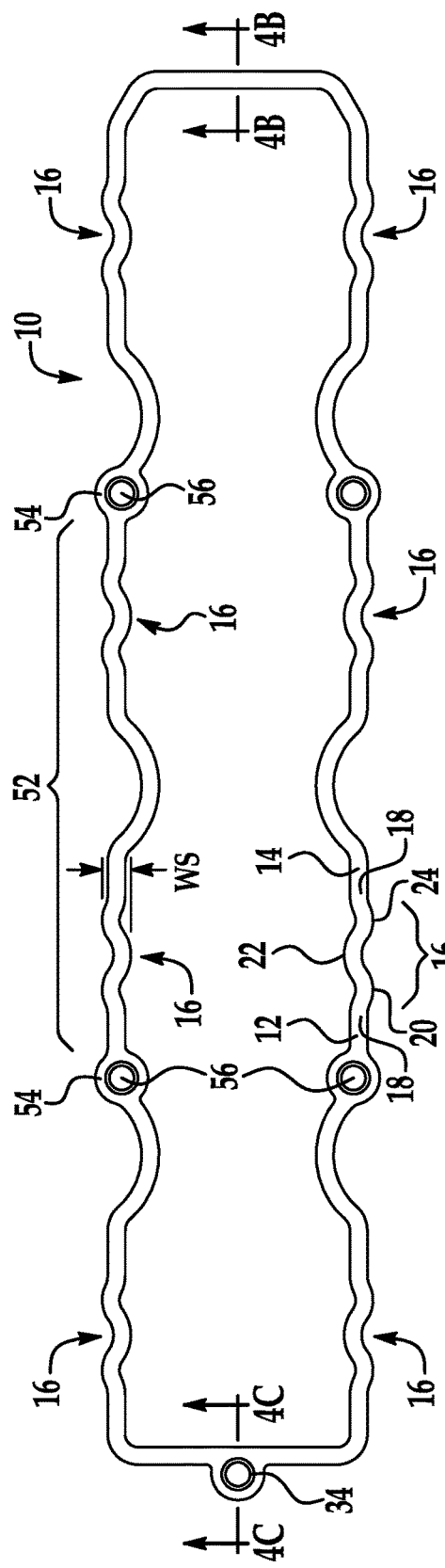
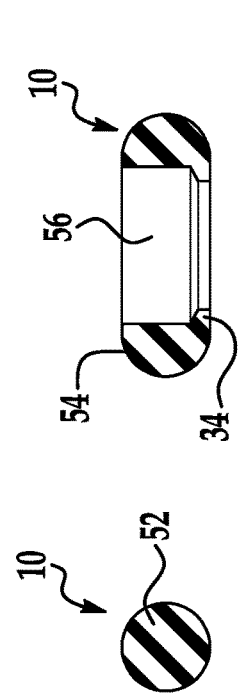
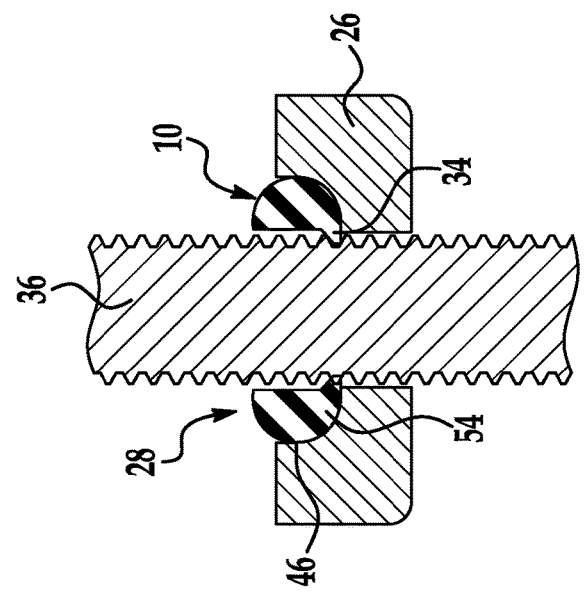
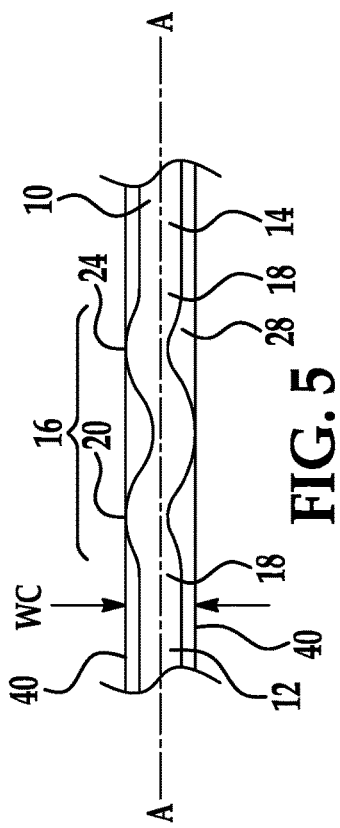

GASKET INCLUDING CHANNEL-RETENTION FEATURES

BACKGROUND

Mechanical assemblies may include two components removably attached to each other and including a gasket therebetween to prevent leakage of gas and/or fluid at the interface of the two components. As an example, engines, such as internal combustion engines for automobiles, include covers that are removable to allow access to internal components for assembly and repair. The cover may be a valve cover (also referred to as a rocker cover), a cylinder head cover, an oil pan, etc. The cover includes a channel and a gasket is seated in the channel to seal between the cover and an engine component, e.g., a cylinder head, engine block, etc. The gasket prevents leakage of gas and/or fluid between the cover and the engine component. The cover may be fastened to the engine component with fasteners, e.g., bolts, that extend through the cover and threadedly engage holes in the engine component to retain the gasket between the cover and the engine component.

Proper sealing between the cover and the engine component to prevent leakage therebetween is dependent upon proper placement of the gasket in the channel. The integrity of the seal may be compromised in scenarios when the seal is improperly positioned between the cover and the engine component during assembly of the cover to the engine component. As an example, improper placement of the gasket during assembly may result in the gasket being pinched between the cover and the engine component outside of the channel, e.g., pinched between flanges on sides of the channel.

BRIEF DESCRIPTION OF THE DRAWINGS

FIG. 4A is a top view of one of the gaskets of FIG. 1.

FIG. 4B is a cross-sectional view through line 4B in FIG. 4A.

FIG. 4C is a cross-sectional view through line 4C in FIG. 4A.

FIG. 5 is a top view a portion of a gasket engaged with a portion of the channel.

FIG. 6 is a cross-sectional view through the cover, one of the gaskets, and one of the fasteners of FIG. 1.

DETAILED DESCRIPTION

Figure 1:
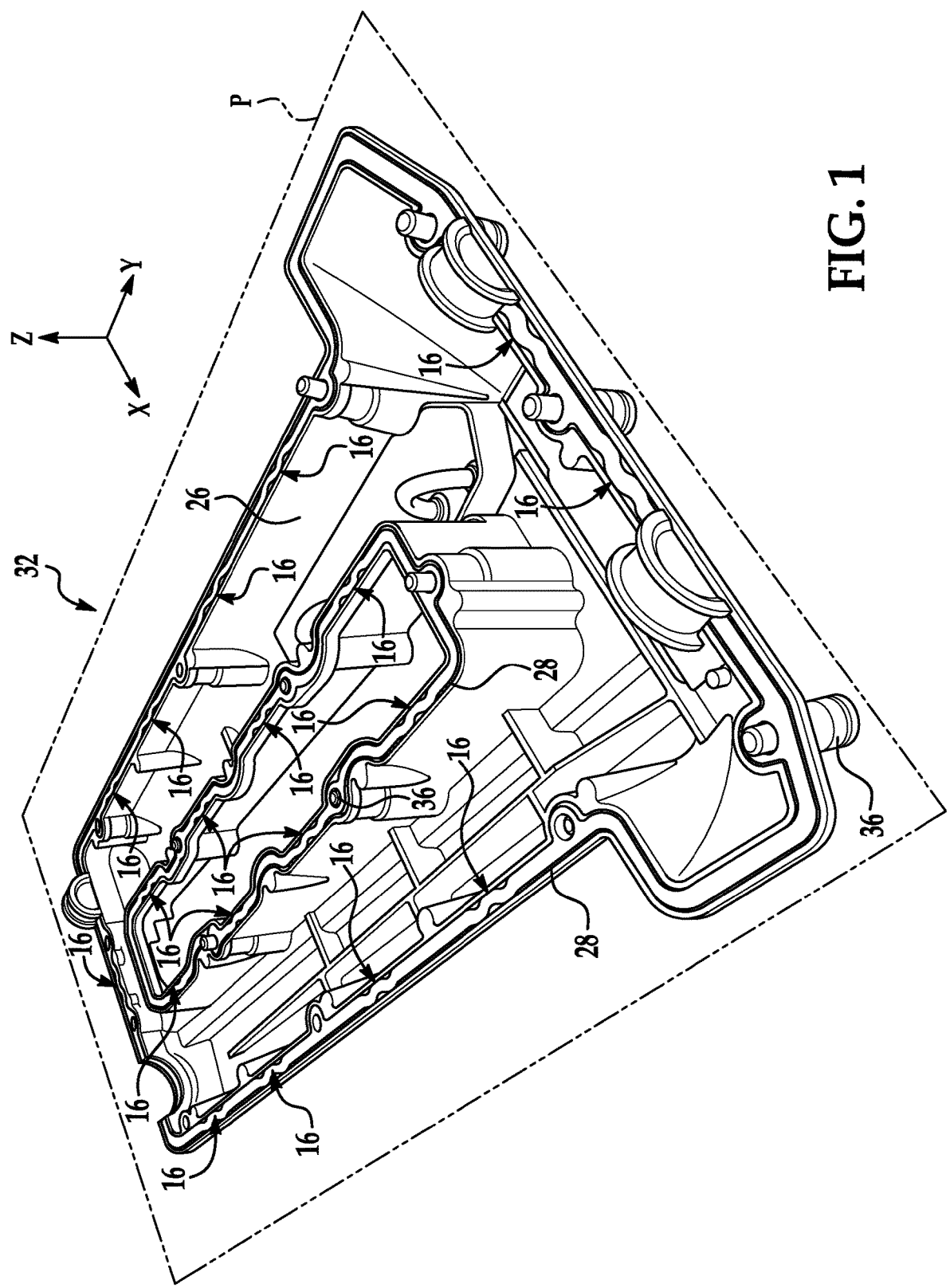
FIG. 1 is a perspective view of an assembly including a cover, two gaskets, and fasteners.

With reference to the Figures, wherein like numerals indicate like parts throughout the several views, a gasket 10 includes an endless loop of sealing material elongated. The endless loop includes a first segment 12, a second segment 14, and a sinuous segment 16 extending from the first segment 12 to the second segment 14. The first segment 12 and the second segment 14 are each elongated in a plane P, i.e., in the same plane. The first segment 12 and the second segment 14 each have an end 18 connected to the sinuous segment 16. The ends 18 are in the plane P and are spaced from each other along an axis A (FIG. 5) central to both ends 18. The sinuous segment 16 has a first peak 20 and a second peak 22. The first peak 20 and the second peak 22 are in the plane P and on opposite sides of the axis A. The gasket 10 includes fastener sections 54 defining fastener holes 56. The fastener holes 56 extend through the fastener sections 54. The sinuous segment 16 is between two of the fastener holes 56. The gasket 10 includes a lip 34 in each fastener hole 56. The lip 34 extends from the fastener section 54 into the fastener hole 56 and extends around the circumference of the fastener hole 56.

With reference to FIG. 1, an assembly 32 includes a cover 26 and the gasket 10. The cover 26 has a channel 28 having a width WC. The gasket 10 is engageable with the cover 26 in the channel 28. When the gasket 10 is disassembled from the cover 26, a width WS of the sinuous segment 16 between the first peak 20 and the second peak 22 is greater than the width WC of the channel 28 of the cover 26.

The sinuous segment 16 of the gasket 10 retains the gasket 10 in the channel 28 to ensure that the gasket 10 is positioned properly relative to the cover 26 as the cover 26 is assembled to a base component of a mechanical assembly, e.g., an engine component of an engine, e.g., a cylinder head, engine block, etc. of an engine. Specifically, since the first peak 20 and the second peak 22 are in the plane P and on opposite sides of the axis A, the first peak 20 and the second peak 22 abut the channel 28 so that the gasket 10 is retained in the channel 28 by interference fit. In other words, since the width WS of the sinuous segment 16 is greater than the width WC of the channel 28, the sinuous segment 16 may be pressed into the channel 28 and frictionally retained in the channel 28. Accordingly, during assembly of the cover 26 to the base component, the gasket 10 is retained in the channel 28 including when the cover 26 is positioned with gravity biasing the gasket 10 in a direction out of the channel 28.

As set forth further below, the gasket 10 may include lips 34 that retain fasteners 36 to the gasket 10. In such an example, the sinuous segment 16 retains the gasket 10 in the channel 28 and the lips 34 retain the fasteners 36 to the gasket 10. During assembly of the cover 26 to the base component, the gasket 10 and the fasteners 36 are retained to the cover 26 regardless of the position of the cover 26, i.e., including positions in which gravity biases the gasket 10 out of the channel 28 and/or biases the fasteners 36 out of the cover 26.

Figure 2:
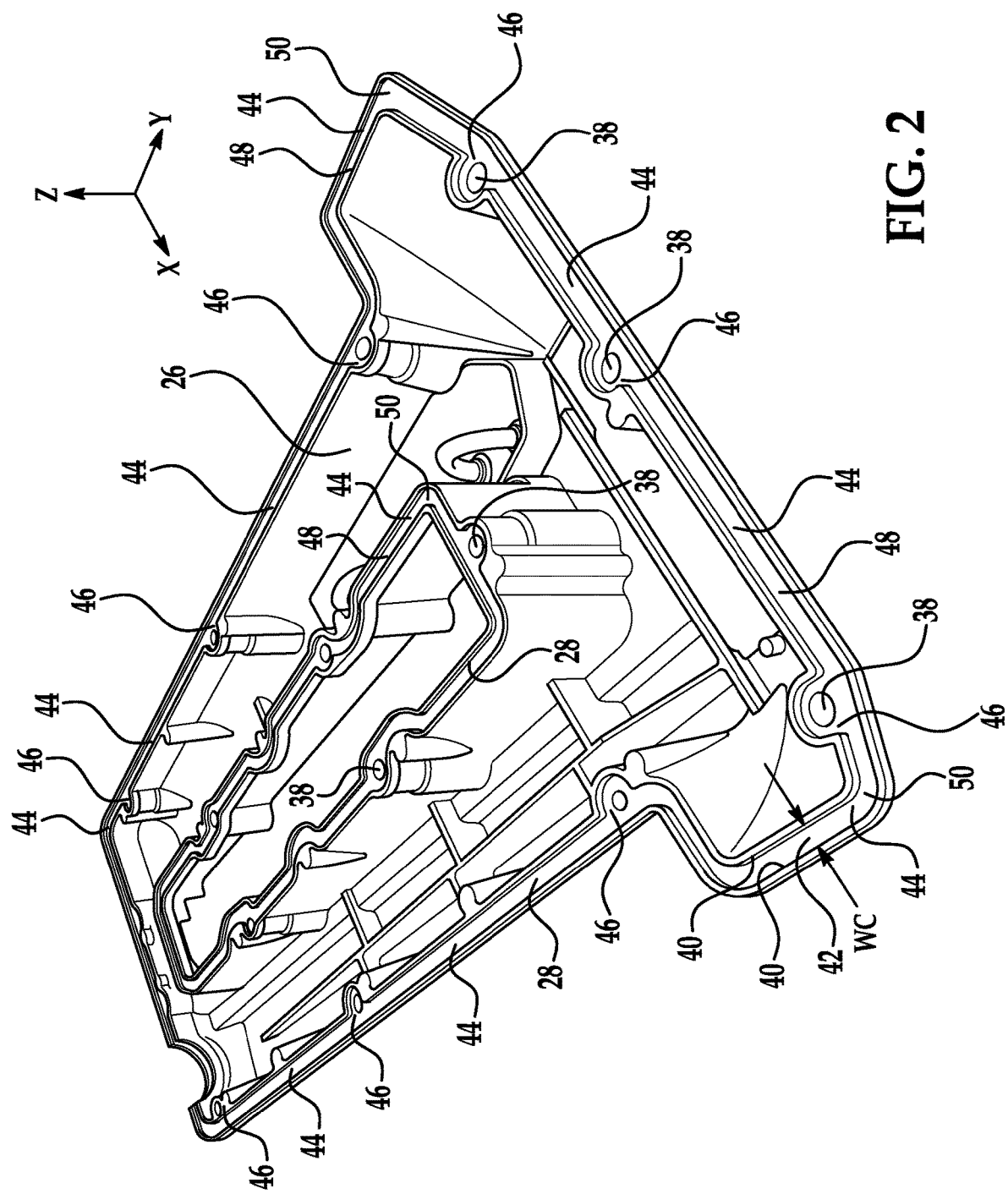
FIG. 2 is a perspective view of the cover including channels for receiving the gaskets.

With reference to FIGS. 1 and 2, the cover 26 is releasably engageable with the base component, e.g., by use of the fasteners 36. The cover 26 may be, for example, a valve cover (also referred to as a rocker cover), a cylinder head cover, an oil pan, etc. The cover 26 may be of any suitable material, e.g., aluminum, steel, plastic, etc. In examples in which the base component is an engine component of an engine, the engine may be, for example, an internal combustion engine, such as for an automobile.

The cover 26 includes fastener holes 38 that receive the fasteners 36. The fastener holes 38 extend through the cover 26, i.e., have two open ends. The base component has threaded fastener holes aligned with the fastener holes 38 of the cover 26 when the cover 26 is assembled to the base component. The fasteners 36 extend through the fastener holes 38, i.e., through both open ends, and threadedly engage the fastener holes 38 of the base component. The fastener holes 38 of the cover 26 may be smooth, i.e., not threaded. The fasteners 36 may be of any suitable type, dimension, etc. The assembly 32 may include any suitable number of fasteners 36. The fasteners 36 may be of any suitable type, e.g., threaded fasteners such as bolts. In such an example, each fastener 36 may include a head and a threaded shaft.

The assembly 32 may include any suitable number of channels 28 and corresponding gaskets 10. In the example shown in the Figures, the assembly 32 includes two channels 28 and two gaskets 10. Common numerals are used to identify common features of the channels 28 and gaskets 10. In other examples, the assembly 32 may include any suitable number, i.e., one or more.

The channel 28 may be an endless loop. The channel 28 may be planar, i.e., the channel 28 may be flat in a plane P, as shown in the example in the Figures. In other examples, the channel 28 may be non-planar, i.e., may curve in the Z-direction (the XYZ coordinates are identified in FIGS. 1-3A).

The channel 28 includes two sides 40 opposing each other, a bottom 42 extending from one side 40 to the other side 40, and an open face opposite the bottom 42. The open face faces the base component when the cover 26 is assembled to the base component. When assembled to the base component, the gasket 10 abuts the bottom 42 of the channel 28 and an opposing face of the base component. Prior to assembly to the base component, the gasket 10 may be taller than the channel 28, i.e., taller in the Z-direction than the distance from the bottom 42 to the open face (the XYZ coordinates are identified in FIG. 3A), such that the gasket 10 is compressed between the bottom 42 and the base component when assembled to the base component.

The channel 28 includes at least one groove section 44. As shown in the examples in the Figures, the channel 28 may include cavities 46 between the groove sections 44. In examples including the cavities 46, each groove section 44 extends 18 from one cavity 46 to another cavity 46. In other examples in which the channel 28 does not include cavities 46, the channel 28 may include one groove section 44 that is endless.

The groove sections 44 are generally U-shaped or C-shaped in cross section. The groove sections 44 may include straight sections 48 and curved sections 50. In other words, the groove sections 44 may be straight and may curve in the XY plane P. The groove section 44 has a width (i.e., width WC) in the XY plane P and a depth in the Z direction.

The groove section(s) 44 may have a constant cross section. In other words, the groove section(s) 44 may have a common shape and size at all cross sections perpendicular to the axis A. Specifically, the width WC of the channel 28, i.e., the distance from one side 40 to the other side 40 perpendicular to the axis A, may be constant.

The cavities 46 are disposed at the fastener holes 38, respectively, of the cover 26. The cavities 46 are wider, i.e., in the X and Y directions, than the groove sections 44 of the channel 28. The cavities 46 may have a common height as the groove sections 44, i.e., in the Z direction. The cavities 46 may round, e.g., circular.

The gasket 10 seals between the cover 26 and the base component to prevent leakage of gas and/or fluid between the cover 26 and the base component. Specifically, the gasket 10 continuously seals between the cover 26 and the base component to prevent leakage of gas and/or fluid along an endless interface between the cover 26 and the base component. As set forth above, when the cover 26 is assembled to the base component, the gasket 10 abuts the bottom 42 of the channel 28 of the cover 26 and the base component and may be compressed therebetween.

The gasket 10 may be resilient to maintain a seal between the cover 26 and the base component when the cover 26 is installed to the base component. The gasket 10, i.e., the sealing material, may be, for example, a polymer. As an example, the gasket 10 may be an elastic polymer (elastomer), i.e., a rubber. For example, the gasket 10 may be silicone. As other examples, the gasket 10 may include paper, cork, etc. and an elastomeric binder. The gasket 10 may include a reinforcement such as a metal wire embedded in the polymer and elongated along the axis A.

The gasket 10 is flexible relative to the cover 26. In other words, the gasket 10 conforms to the shape of the cover 26 when installed in the channel 28. Prior to assembly of the gasket 10 to the cover 26, the gasket 10 may match the shape of the channel 28. When unassembled from the cover 26, the gasket 10 may be planar, i.e., flat in a plane P. When installed in the channel 28 shown in the Figures, the gasket 10 is planar, i.e., may be flat on a plane P. In examples in which the channel 28 is planar, the channel 28 and the gasket 10 are flat in the same plane P.

In the examples shown in the Figures, the gasket 10 is an endless loop. With reference to FIGS. 3A-5, the gasket 10 includes at least one elongated section 52. As shown in the example in the Figures, the gasket 10 may have fastener sections 54. In examples including fastener sections 54, the elongated section(s) 52 and the fastener sections 54 are unitary, i.e., the gasket 10 is a single, uniform piece of material with no seams, joints, fasteners, or adhesives holding the elongated section(s) 52 and the fastener sections 54 together. In other words, the elongated section(s) 52 and the fastener sections 54 are formed together simultaneously as a single continuous unit, e.g., by molding. When the cover 26 is assembled to the base component, the elongated section(s) 52 of the gasket 10 are disposed in the groove section(s) 44 of the cover 26. In examples including fastener sections 54 and cavities 46, the fastener sections 54 of the gasket 10 are disposed in the cavities 46 of the cover 26.

In examples in which the gasket 10 is planar, the elongated section(s) 52 are elongated in the XY plane P. The elongated sections 52 may be straight and/or curvilinear.

As one example, the fastener sections 54 may be between elongated sections 52. As another example, the fastener sections 54 may be along the elongated section 52, i.e., extending laterally from the elongated section 52. In one example, the elongated section 52 is endless and the fastener sections 54 extend laterally from the elongated section 52. In other examples, the gasket 10 includes no fastener section 54 connected to the elongated section 52.

The elongated section 52 includes the sinuous segment 16, the first segment 12, and the second segment 14. The elongated section 52 may include any suitable number of sinuous segments 16, first segments 12, and second segments 14. The terms "first segment 12" and "second segment 14" are identifiers for the segments of the elongated section 52 on opposite sides of the sinuous segment 16. In examples including more than one sinuous segment 16, the elongated segment includes one first segment 12 and one second segment 14 on opposing sides of the sinuous segment 16. For each sinuous segment 16, the first segment 12, the second segment 14, and the sinuous segment 16 may be flat in a plane P, e.g., the XY plane P.

When installed in the channel 28, the sinuous segment 16 turns relative to the portion of the channel 28 engaged by the sinuous segment 16. In some examples, the sinuous segment 16 of the gasket 10 may be engaged with the straight section 48 of the channel 28. In other examples, the sinuous segment 16 of the gasket 10 may be engaged with the curved section 50 of the channel 28. In either example, the sinuous segment 16 has multiple turns relative to the portion of the channel 28 engaged by the sinuous segment 16.

As set forth above, the first segment 12 and the second segment 14 each have an end 18 connected to the sinuous segment 16. The end 18 of the first segment 12 and the end 18 of the second segment 14 are spaced from each other along the axis A central to both ends 18. In other words, the axis A bisects both ends 18. The ends 18 may be elongated along the axis A. The axis A may be the central axis A of the first segment 12 and the second segment 14 along which the first segment 12 and the second segment 14 are elongated, i.e., the first segment 12 and the second segment 14 may be coaxial. The axis A may be straight or may curve. In the examples shown in the Figures, the axis A is in the XY plane P.

The sinuous segment 16 is designed to resiliently engage both opposing sides of the channel 28 in the cover 26. The sinuous segment 16 may be installed in the channel 28 by pressing the sinuous segment 16 into the channel 28. Before assembly into the channel 28, the sinuous shape has a pre-installation shape. During assembly into the channel 28, the sinuous segment 16 resiliently deforms to the channel 28 to a post-installation shape, i.e., when in the post-installation shape, the sinuous segment 16 conforms to the shape of the channel 28 while biasing itself against the sides 40 of the channel 28 toward the pre-installation shape. When assembled into the channel 28, the sinuous segment 16 creates an interference fit with the channel 28. The interference fit creates sufficient engagement with the sides 40 of the channel 28 to prevent the sinuous segment 16 from falling from the channel 28 under the force of gravity. The sinuous segment 16 elongates along the axis A when pressed into the channel 28. The sinuous segment 16 may be installed into the channel 28 by hand, i.e., by pressing the sinuous segment 16 into the channel 28 with fingers.

The sinuous segment 16 has a sinuous shape, i.e., has more than one turn. The sinuous shape is defined by the peaks. As set forth above, the sinuous segment 16 has the first peak 20 and the second peak 22. The sinuous segment 16 may have any suitable number of peaks. In the example shown in the Figures, the sinuous segment 16 has three peaks, specifically, the first peak 20, the second peak 22, and a third peak 24. The peaks 20, 22, 24 may be curved or sharp, i.e., the sinuous shape may be curved, zig-zagged, etc.

Figure 3A:
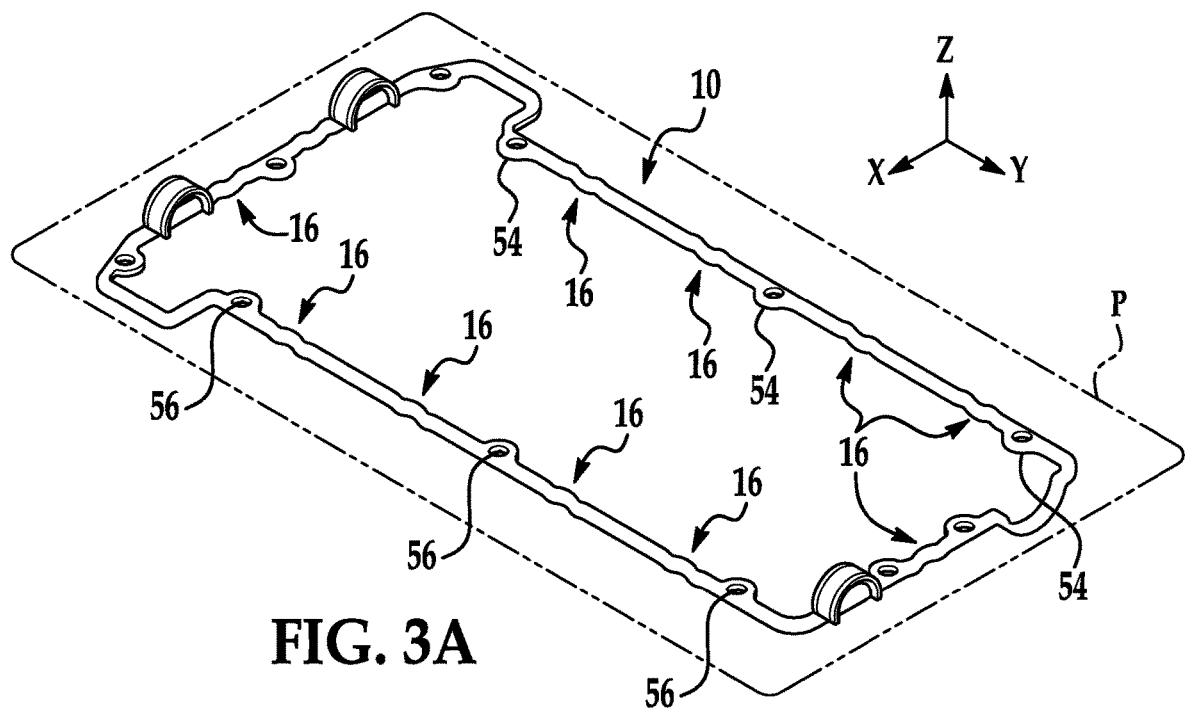
FIG. 3A is a perspective view of one of the gaskets in FIG. 1.
Figure 3B:
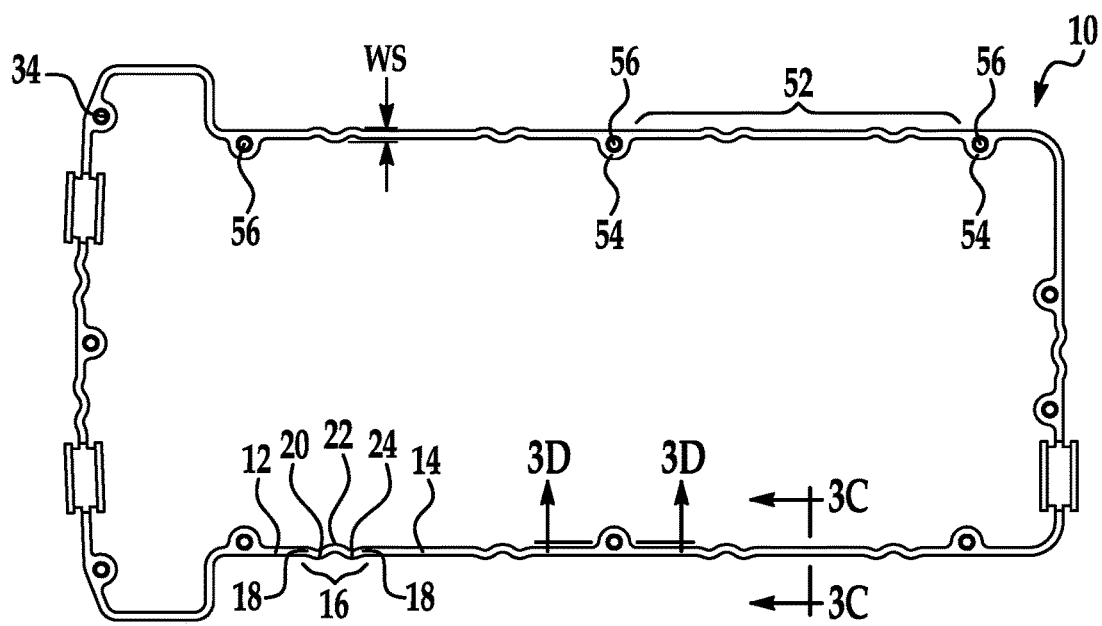
FIG. 3B is a top view of the gasket of FIG. 3A.
Figure 3C:
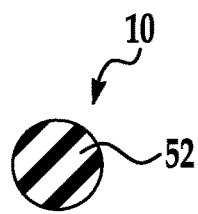
FIG. 3C is a cross-sectional view through line 3C in FIG. 3B.

With reference to FIGS. 3B and 4A, the first peak 20 and the second peak 22 are on opposite sides 40 of the axis A. The third peak 24 is on a common side of the axis A as the first peak 20. The second peak 22 is between the first peak 20 and the third peak 24. For example, the second peak 22 is equidistantly spaced along the axis A from the first peak 20 and the third peak 24. The first peak 20, the second peak 22, and the third peak 24 may be equidistantly spaced from the axis A, i.e., measured perpendicular to the axis A.

In the pre-assembled shape, the sinuous segment 16 is wider than the channel 28. The width WS of the sinuous segment 16 is from the first peak 20 to the second peak 22. In other words, the width WS of the sinuous segment 16 is the sum of a distance from the axis A to the first peak 20 perpendicular to the axis A and a distance from the axis A to the second peak 22 perpendicular to the axis A. The channel 28 has a width WC that is less than the width WS of the sinuous segment 16 when the sinuous segment 16 is in the pre-assembled shape. When installed in the groove, the peaks 20, 22, 24 change angle to elongate the sinuous segment 16 along the axis A.

The gasket 10 may have a constant cross section along the first segment 12, the second segment 14, and the sinuous segment 16. In the example shown in the Figures, the gasket 10 has a round cross section, and more specifically a circular cross section (See FIGS. 3C and 4B). In other words, the gasket 10 may be bead-shaped. Other examples include polygonal, e.g., rectangular cross section.

As set forth above, in examples including fastener sections 54 and cavities 46, the fastener sections 54 of the gasket 10 are disposed in the cavities 46 of the cover 26. The fastener sections 54 may match the shape of the cavities 46 in the XY plane P. The gasket 10 includes fastener holes 38 through the gasket 10 and positioned to be aligned with the fastener holes 38 in the cover 26. The fastener sections 54 of the gasket 10 define fastener holes 56 aligned with the fastener holes 38 in the cover 26 when the gasket 10 is installed in the groove. In other words, the fastener hole 56 extends through the fastener section 54. In such an example, the fastener section 54 is generally circular in shape. The fastener section 54 extends circularly about the fastener hole 56. One of the elongated sections 52 extends in a direction from the fastener section 54 and another one of the elongated sections 52 extends in another direction from the fastener section 54. These elongated sections 52 may extend linearly, i.e., in a straight line, from the fastener section 54.

Figure 3D:
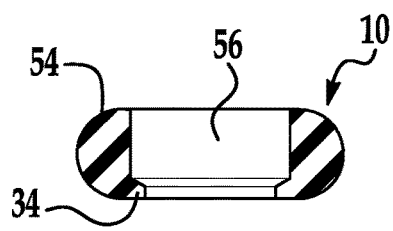
FIG. 3D is a cross-sectional view through line 3D in FIG. 3B.

With reference to FIGS. 3D, 4C, and 6, the gasket 10 includes a lip 34 extending into the fastener holes 56 of the gasket 10. The lip 34 extends 18 around the circumference of the fastener holes 38. As one example, the lip 34 may be continuous around the circumference of the fastener hole 56. As another example, the lip 34 may include a plurality of segments spaced from each other around the circumference of the fastener hole 38.

The lip 34 is designed to releasably retain the fastener 36 in the fastener hole 56 of the gasket 10. Specifically, the lip 34 is sized and shaped to create an interference fit with the fastener 36 when the fastener 36 is inserted into the fastener hole 56 of the gasket 10. The interference fit creates sufficient engagement with the fastener 36 to prevent the fastener 36 from falling from fastener hole 56 under the force of gravity. The lip 34 is designed to allow the fastener 36 to rotated in the fastener hole 56 to allow for threaded engagement of the fastener 36 with a threaded hole in the base component.

The sinuous segments 16 and the lips 34 provide gasket 10 retention and fastener 36 retention for ease of assembly of the cover 26 to the base component. Specifically, the sinuous segments 16 retain the gasket 10 in the groove in a first direction (e.g., +Z direction in FIG. 1) and the lips 34 retain the fasteners 36 in the fastener holes 38 of the gasket 10 in a second direction opposite the first direction (e.g., −Z direction in FIG. 1). Accordingly, the cover 26 may be turned to multiple positions to install the gasket 10 and the fasteners 36, i.e., from opposite directions, without losing gasket 10/fasteners 36 already installed to the cover 26. In addition, the cover 26 may be turned in various positions during installation to the base component without losing the gasket 10 or the fasteners 36. The retention of the gasket 10 in the channel 28 also ensures proper placement of the gasket 10 between the cover 26 and the base component to seal between the cover 26 and the base component. The sinuous segments 16 and the lips 34 thus increase the likelihood of proper cover 26 and seal placement when the fasteners 36 are tightened to the base component to secure the cover 26 to the base component. The retention of the fasteners 36 to the cover 26 increases the ease of aligning the fasteners 36 with the threaded holes in the base component while the gasket 10 is also retained in the channel 28.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a cover having a channel and fastener holes, the channel having a width; and
   a gasket engageable with the cover in the channel;
   the gasket having a first segment, a second segment, and a sinuous segment extending from the first segment to the second segment;
   the first segment and the second segment each having an end connected to the sinuous segment, the ends spaced from each other along an axis central to both ends;
   the sinuous segment having a first peak and a second peak on opposite sides of the axis, a width of the sinuous segment between the first peak and the second peak being greater than the width of the channel;
   the gasket including fastener sections defining fastener holes, the fastener holes of the gasket extending through the fastener sections and positioned to be aligned with the fastener holes of the cover, the sinuous segment being between two of the fastener holes of the gasket; and
   the gasket includes a lip in each fastener hole, the lip extending from the fastener section into the fastener hole and extending around the circumference of the fastener hole.

2. The assembly as set forth in claim 1, wherein the channel includes a straight section and the sinuous segment of the gasket is positioned to be engaged with the straight section.

3. The assembly as set forth in claim 1, wherein the first peak and the second peak are equidistantly spaced from the axis.

4. The assembly as set forth in claim 3, wherein the sinuous segment includes a third peak on a common side of the axis as the first peak, the second peak being between the first peak and the third peak, and the first peak and the third peak being equidistantly spaced from the axis.

5. The assembly as set forth in claim 4, wherein the second peak is equidistantly spaced along the axis from the first peak and the third peak.

6. The assembly as set forth in claim 1, wherein the sinuous segment includes a third peak on a common side of the axis as the first peak, the second peak being between the first peak and the third peak, and the first peak and the third peak being equidistantly spaced from the axis.

7. The assembly as set forth in claim 1, wherein the gasket has a constant cross section along the first segment, the second segment, and the sinuous segment.

8. The assembly as set forth in claim 1, wherein the lip is designed to releasably retain a fastener in the fastener hole of the gasket.

9. The assembly as set forth in claim 1, wherein the lip is continuous around the circumference of the fastener hole.

10. The assembly as set forth in claim 1, wherein the gasket includes elongated sections, at least one of the elongated sections including at least one sinuous segment, and for each fastener section, one of the elongated sections extends in a direction from the fastener section and another one of the elongated sections extends in another direction from the fastener section.

11. The assembly as set forth in claim 10, wherein the elongated sections and the fastener sections are unitary.

12. The assembly as set forth in claim 1, further comprising a fastener releasably retained in the fastener hole by the lip.

13. The assembly as set forth in claim 1, wherein the width of channel is constant.

14. The assembly of claim 1, wherein the width of the sinuous segment is the sum of a distance from the axis to the first peak perpendicular to the axis and a distance from the axis to the second peak perpendicular to the axis.

15. A gasket comprising:
    an endless loop of sealing material elongated;
    the endless loop including a first segment, a second segment, and a sinuous segment extending from the first segment to the second segment;
    the first segment and the second segment each elongated in a plane, the first segment and the second segment each having an end connected to the sinuous segment, the ends being in the plane and spaced from each other along an axis central to both ends;
    the sinuous segment having a first peak and a second peak, the first peak and the second peak being in the plane and on opposite sides of the axis;
    fastener sections defining fastener holes, the fastener holes extending through the fastener sections, the sinuous segment being between two of the fastener holes; and
    a lip in each fastener hole, the lip extending from the fastener section into the fastener hole and extending around the circumference of the fastener hole;
    the sinuous segment being designed to resiliently engage both opposing walls of a groove in a cover and the lip is designed to releasably retain a fastener in the fastener hole.

16. The gasket as set forth in claim 15, wherein the first segment and the second segment each have a width, and a width of the sinuous segment from the first peak to the second peak is greater than the width of the first segment and the width of the second segment.

17. The gasket as set forth in claim 15, wherein the sinuous segment includes a third peak in the plane and on a common side of the axis as the first peak, the second peak being between the first peak and the third peak, and the first peak and the third peak being equidistantly spaced from the axis.

18. The gasket as set forth in claim 15, wherein the gasket has a constant cross section along the first segment, the second segment, and the sinuous segment.

19. The assembly as set forth in claim 15, wherein the gasket includes elongated sections, at least one of the elongated sections including at least one sinuous segment, and for each fastener section, one of the elongated sections extends in a direction from the fastener section and another one of the elongated sections extends in another direction from the fastener section.

20. The assembly as set forth in claim 1, wherein:
    the channel includes opposing sides;
    the width of the sinuous segment between the first peak and the second peak is greater than the width of the channel prior to engagement of the gasket with the cover in the channel; and
    the sinuous segment is designed to resiliently engage the opposing sides of the channel with the first peak and the second peak abutting the opposing sides of the channel when the gasket is engaged with the cover in the channel.

* * * * *